Figure 1:
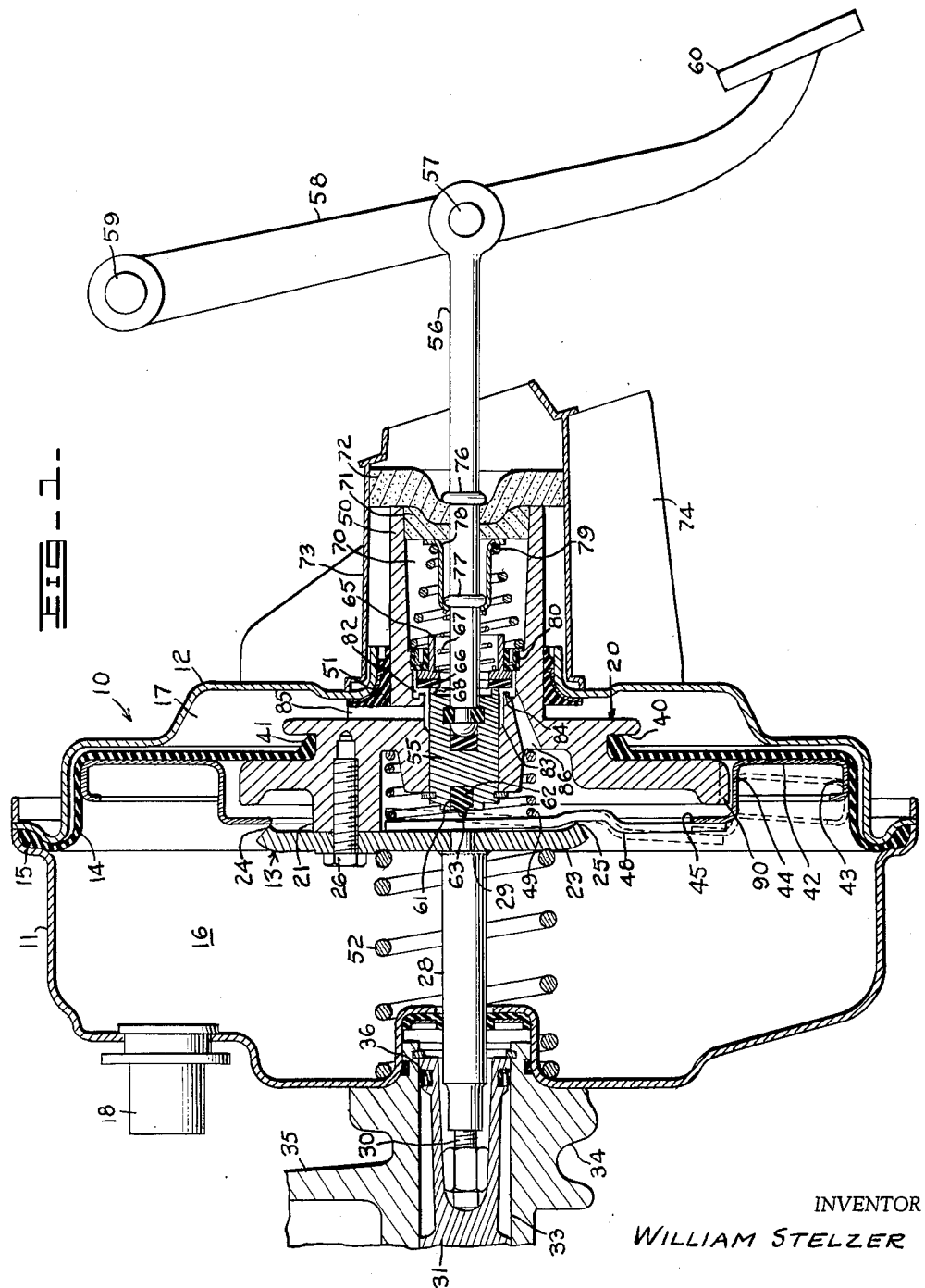

March 1, 1966 W. STELZER 3,237,525
FLUID PRESSURE MOTOR MECHANISM
Filed Dec. 27, 1963 2 Sheets-Sheet 1

INVENTOR
WILLIAM STELZER
BY John F. Phillips
ATTORNEY

March 1, 1966 W. STELZER 3,237,525
FLUID PRESSURE MOTOR MECHANISM
Filed Dec. 27, 1963 2 Sheets-Sheet 2

INVENTOR
WILLIAM STELZER

BY John F. Phillips
ATTORNEY

United States Patent Office 3,237,525
Patented Mar. 1, 1966

3,237,525
FLUID PRESSURE MOTOR MECHANISM
William Stelzer, Bloomfield Hills, Mich., assignor to Kelsey-Hayes Company, Romulus, Mich., a corporation of Delaware
Filed Dec. 27, 1963, Ser. No. 333,928
11 Claims. (Cl. 91—369)

This invention relates to motor vehicle power brake units and more particularly to a simplified reaction device for resisting the brake pedal application in a certain ratio to the power applied.

A number of structures have been developed wherein pedal reaction opposing valve operation of the pedal has been provided in proportion to the degree of energization of the booster motor, thus providing the brake pedal with accurate "feel." Many of such mechanisms have involved the use of reaction levers, usually distributed circumferentially around the motor piston, to be subjected to differential pressures affecting the piston for reacting against the brake pedal. Such installations involve a number of disadvantages, such as the complicated and expensive manufacture of the device, friction developed in the pivoting of the levers, etc.

An important object of the present invention is to provide a motor mechanism of the type referred to wherein the reaction device is built on the principle of slightly tilting a portion of the power piston, by manual force, out of its normal plane against the force of the power affecting the motor piston.

A further object is to accomplish such a result through the use of a single lever rather than a plurality of levers.

A further object is to produce a simplification of construction and also to reduce the pivot loads.

A further object is to accomplish in a mechanism of this character the elimination of a considerable amount of friction compared with present multi-lever constructions in which, due to shorter lever lengths, a less favorable geometry of the lever system is possible.

A further object is to reduce friction to the movement of the diaphragm plate by tilting it instead of utilizing the usual axial sliding arrangement used in present power units.

Other objects and advantages of the invention will become apparent during the course of the following description.

Figure 2:
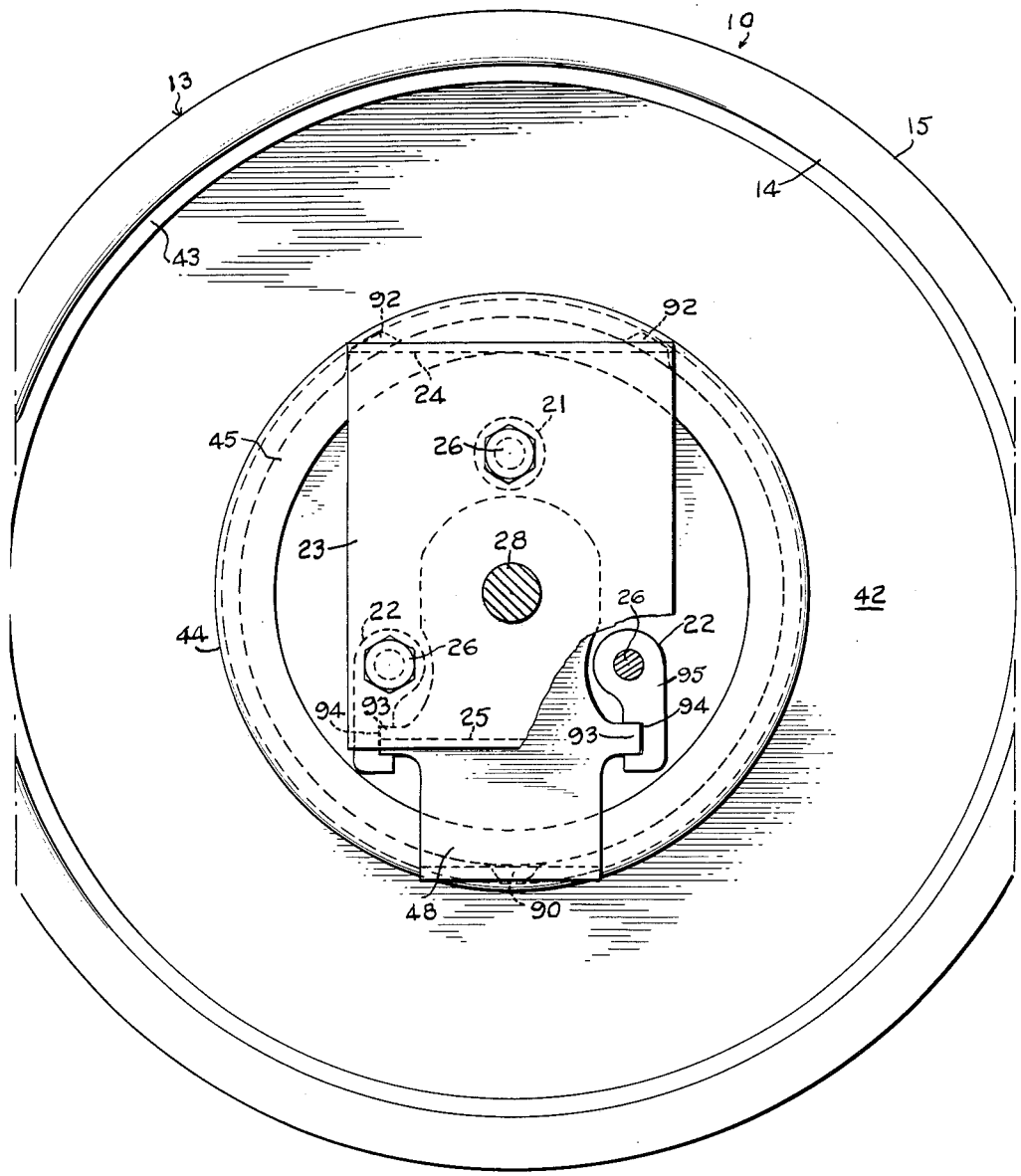

In the drawings I have shown one embodiment of the invention. In this showing:

FIGURE 1 is an axial sectional view through the motor mechanism showing a portion of the brake master cylinder and showing the connection of the device to a brake pedal, and FIGURE 2 is a face view of the motor piston looking from the left side in FIGURE 1, the diaphragm being eliminated and the force-transmitting rod being shown in section.

Referring to the drawings, the numeral 10 designates the motor mechanism as a whole comprising a pair of casing sections 11 and 12 having a pressure responsive unit therein indicated as a whole by the numeral 13 and described in detail below. The pressure responsive unit or piston includes a rolling diaphragm 14 having at its outer periphery an annular bead 15 clamped between the two casing sections. The piston 13 divides the motor casing to form a constant pressure chamber 16 and a variable pressure chamber 17. In the present instance, the motor is of the vacuum type and the casing section 11 is provided with a fitting 18 for connecting the chamber 16 to a suitable source of vacuum such as the intake manifold of the motor vehicle engine.

The piston 13 comprises a preferably cast body 20, which may be formed of plastic, if desired, and this body is provided with an upper boss 21 and two lower bosses 22 (FIGURE 2) against which seats a rigid plate 23 having its upper and lower edges turned inwardly to form parallel fulcrum edges 24 and 25 respectively (FIGURE 2), for a purpose to be described. The plate 23 is fixed to the body 20 by screws 26 threaded in the three bosses 21 and 22.

A force-transmitting member 28 is connected at its right-hand end (FIGURE 1) to the plate 23 and is preferably welded thereto as at 29. The force-transmitting member 28 is in the form of a rod having adjustable connection as at 30 with the plunger 31 operable in the bore 33 of a master cylinder unit 34 having the usual reservoir 35. The plunger 31 is sealed in the bore 33 as at 36 to generate hydraulic pressure in the usual pressure chamber (not shown) when the master cylinder plunger is operated as described below. The pressure chamber is connected to the vehicle wheel cylinders (not shown) in the usual manner.

The body 20 is annularly grooved as at 40 to receive the annular inner bead 41 of the diaphragm 14. Against the diaphragm is arranged a plate 42 having a radially outer flange 43 over which the diaphragm is adapted to roll. The plate 42 is also provided with an inner annular cylindrical flange 44 terminating in a radially inwardly extending flange 45 against which engages the fulcrum edge 24 at the top thereof as viewed in FIGURE 1.

The fulcrum edge 25 engages against a diametrically arranged lever 48, the upper end of which, in the off positions of the parts shown in FIGURE 1, engages against the inner face of the plate 23. The lower end of the lever engages against the outer surface of the flange 45. The lever 48 is the reaction transmitting element of the present invention, as further described below. A counter reaction spring 49 biases the lever 48 to its normal or off position shown.

The body 20 is provided at the side thereof opposite the rod 28 with a tubular extension 50 slidable in a seal 51 carried by the casing section 12, the seal extending inwardly of the adjacent portion of the section 12 to act as a bumper to limit movement of the piston 13 to off position. The piston is biased to such position by a return spring 52.

The body 20 has an axially slidable control piston 55 suitably connected to a push rod 56 connected as at 57 to a depending brake pedal 58, pivotally supported at its upper end as at 59 and having the usual pedal pad 60 at its lower end. The control piston 55 is provided in its inner end with an axial recess 61 in which is arranged a resilient bumper 62 having an axial projection 63 normally out of contact with but engageable with the lever 48 above its pivot 25.

A valve unit 65 surrounds the push rod 56 and carries a resilient valve 66 biased to the left in FIGURE 1 by a light spring 67 to normally engage an air valve seat 68 carried by the control piston 55.

The interior of the tubular portion 50 forms an air chamber 70 communicating with the atmosphere through a pair of air filters 71 and 72, the former of which is slidable in the tubular member 50. The air cleaner 72 is slidable in a cylindrical shell 73 connected to a bracket 74 fixed to the casing section 12. The air cleaner 72 is retained in position on the push rod 56 by an annular rib 76 on the rod 56, and the latter element carries a second annular rib 77 engaged by a spring seat 78, the left-hand end of which engages the rib 77 to limit movement of the member 78 toward the right. The right-hand end of the member 78 is engaged by one end of a spring 79, the other end of which engages a sealing unit 80 in which the valve unit 65 is slidable.

The valve 66 normally cuts off communication between the chamber 70 and a chamber 82 to the left of the valve 66, and this chamber communicates with a small annular chamber 83 around a vacuum valve seat 84 formed on the body 20. The chamber 83 communicates with the motor chamber 17 through one or more radial slots 85 formed in the adjacent end of the body 20, and communicates with the motor chamber 16 through a port 86.

As previously stated, the lever 48 provides the medium through which reaction forces are transmitted to the brake pedal, and these reaction forces are provided through a tilting action of a portion of the piston 13 in accordance with the present invention. This tilting action takes place in the diaphragm 14 and plate 42 independently of the body 20, which is rigid and is fixed for axial movement relative to the motor. For supporting the tiltable portions of the piston 13, the periphery of the body 20 is provided with a lower radial boss 90 and upper radial bosses 92 (FIGURE 2). It will be noted that the bosses 92 are approximately in the horizontal plane of the fulcrum edge 24, and this is important from a practical standpoint for the reduction of friction, as will become apparent. The lever 48 is provided with laterally oppositely extending trunnions 93 (FIGURE 2), and these trunnions are mounted in recesses 94 formed in downwardly extending portions 95 of the bosses 22. It will be noted that the trunnions 93 and recesses 94 also are arranged substantially in a common horizontal plane to eliminate relative sliding movement of the parts and thus reduce friction to a minimum. The substantial elimination of friction along the lines of the two pivot edges referred to is highly important from a practical standpoint.

*Operation*

As stated, the motor is of the vacuum type, and the piston 13 is vacuum suspended in the normal positions of the parts. To this end, the motor chamber 17 communicates through radial slot 85, chamber 83, and passage 86 with the motor chamber 16, the latter being in fixed communication with a source of vacuum through the fitting 18 and through suitable piping connected thereto. The valve 66 is normally in engagement with the air valve seat 68, thus cutting off the admission of air to the chamber 83, while the vacuum valve seat 84 is open. The projection 63 of the bumper 62 will be free of the lever 48, the upper end of the lever being held against the plate 23 by the counter reaction spring 49. The lower end of the lever 48 will be in engagement with flange 45.

While the portion of the plate 42 and the portion of the diaphragm 14 engaged thereby have been illustrated in FIGURE 1 as being prependicular to the axis of the motor, it will be understood that in the off positions of the parts, the plate 42 will be slightly out of such plane. This is due to the action of the spring 49 against the lever 48 when no pressure is present in the motor chamber 17.

When the motor is to be energized, the pedal 58 is actuated to move the push rod 56 (FIGURE 1) to the left to move the control piston 55. The spring 67 causes the valve unit 65 to follow the valve seat 68 and when the valve 66 engages the seat 84, the chamber 83 will be closed to the passage 86, and accordingly, the motor chambers 16 and 17 will be disconnected from each other. At this time, the bumper projection 63 will engage the lever 48 and the resiliency of the projection 63 permits deformation thereof with negligible pedal effort.

Slight further movement of the pedal 58 will crack the valve seat 68 while the valve 66 remains in engagement with the seat 84. Air will flow through the air cleaners 71 and 72 into the chamber 70, thence around valve seat 68 into the motor chamber 17, and differential pressure will move the motor piston 13 to the left.

Such movement of the piston 13 operates the master cylinder plunger to displace fluid to the wheel cylinders. Since little force is required to move the brake shoes up to the drums, the initial motor operation takes place quite easily with little differential pressures on opposite sides of the piston 13. As soon as the brake shoes engage the drums, movement of the master cylinder plunger is retarded and a more rapid increase in pressure occurs in the motor chamber 17. After a certain predetermined pressure is reached in the motor chamber 17, acting toward the left against the diaphragm and the plate 42, the lower end of the lever 48 will be swung to the left and the spring 49 will yield. Thereafter, any additional pressure transmitted from the plate 42 to the lower end of the lever reacts against the control piston 55, push rod 56 and pedal 58 to resist movement of the pedal and thus provide it will "feel" reaction proportional to differential pressures in the chambers 16 and 17.

It will be apparent that the plate 42 is free to swing about the fulcrum edge 24 upon the application of manual forces to the upper end of the lever 48 by the control piston 55. Incidentally, the bumper 62 and its recess 61 are so proportioned that the recess is completely filled under predetermined pressure of the lever against the bumper, whereupon the upper end of the lever, though cushioned in its movement, seats against the adjacent end of the control piston 55. The utilization of the swinging movement of the plate 42 and the adjacent portion of the diaphragm permits the transmission of reaction forces through the lever 48 is a substantially simplified, sensitive and accurate operation. The plate 23 is rigidly held in position on the push rod 28 and against the body 20, and the latter two elements are guided for accurate axial movement. Therefore, the plate 23 partakes of such accurate movement and the fulcrum edge 24 is rigid and thus serves as an effective fulcrum for the adjacent portion of the flange 45. Similarly, the fulcrum edge 25 is rigid with respect to the rod 28 and body 20 and effectively fulcrums the lever 48 for rocking movement under the influence of pressures in the chamber 17 and manual forces delivered to the upper end of the lever.

A portion of the forces acting on the lever is transmitted directly to the plate 23, through the fulcrum edge 25, such forces being applied to the lever manually at the upper end thereof and by motor pressures at the lower end thereof. The lever is called upon to transmit only a relatively light load, making possible a longer lever arm and a consequently smaller angular movement thereof. The small angular movement of the lever, the placing of the bosses 92 (FIGURE 2) approximately in the plane of the fulcrum edge 24, and the fulcruming of the lever 48 as at 93 approximately in the plane of the fulcrum edge 25, which two planes are parallel to the axis of the piston 13, substantially eliminates any sliding of the fulcrum edge 24 over the flange 45 and any sliding movement of the fulcrum edge 25 over the lever 48. Thus friction is negligible and the structure permits smooth operation, giving the best possible pedal "feel." The lever ratio may be altered by changing the distance of one or both of the fulcrum edges 24 or 25 from the axis of the piston, or by extending or shortening the lower end of the lever 48.

When the pedal is released, the spring 79, acting through cage 78, returns the push rod 56 to normal position, restoring the off positions of the valve and valve seats. Air will be cut off from the motor chamber 17 and such chamber will again communicate with the motor chamber 16, and the piston will be vacuum suspended. The air cleaners 71 and 72 are resilient, and as stated, they are slidable in the members 50 and 73. Thus they are free to move to the left when the pedal is operated.

In the event of a power failure, operation of the pedal 58 will cause the control piston 55 to engage the lever 48, which is in contact with the plate 23, and accordingly, pedal forces can be directly transmitted to the push rod 28. It will be understood that the master cylinder may be of any desired type having one or more hydraulic pressure chambers properly connected to the wheel cylinders of the vehicle.

From the foregoing it will be apparent that the present construction is substantially simplified as compared with prior constructions employing reaction levers. A single lever is employed which is highly sensitive and accurate in its operation because of the simplicity of the construction and the substantially complete elimination of friction.

It is to be understood that the form of the invention shown and described is to be taken as a preferred example of the same and that various changes in the shape, size and arrangement of the parts may be made as do not depart from the spirit of the invention or the scope of the appended claims.

I claim:

1. In a fluid pressure motor mechanism, a motor casing, a pressure responsive unit forming with said casing an expansible chamber, said unit comprising a rigid axial portion and a wall connecting such portion to said casing, said wall being tiltable to an angular position relative to a plane transverse to the axis of said casing, a manually operable valve mechanism to direct fluid pressure from a source to said expansible chamber and from said chamber, and means having mechanical engagement with said rigid portion of said unit, with said manually operable valve mechanism and with said wall solely to one side of the axis of said rigid portion to be moved incident to operation of said valve mechanism and by tilting movement of said movable wall incident to increases in pressure in said expansible chamber to oppose operation of said valve mechanism to thereby tend to reduce the power of the motor mechanism.

2. In a fluid pressure motor mechanism, a motor casing, a pressure responsive unit forming with said casing an expansible chamber, said unit comprising a rigid axial portion and a movable wall connecting such portion to said casing, said wall being tiltable out of a plane transverse to the axis of said casing, a manually operable valve mechanism to direct fluid pressure from a source to said expansible chamber and from said chamber, and a single lever extending to one side of the axis of the motor mechanism and having mechanical engagement with said rigid portion of said unit, with said manually operable valve mechanism and with said wall to be moved incident to operation of said valve mechanism and by tilting movement of said movable wall incident to increases in pressure in said expansible chamber to oppose operation of said valve mechanism to thereby tend to reduce the power of the motor mechanism.

3. A motor mechanism according to claim 2 wherein said rigid unit has a member fixed thereto and engaging a portion of said wall at the opposite side of the axis of said unit to provide a pivot fulcrum for tilting movement of said wall.

4. In a fluid pressure motor mechanism, a motor casing, a pressure responsive unit forming with said casing an expansible chamber, said unit comprising a rigid axial portion, a member extending diametrically across the axis of said rigid portion, a force-transmitting member connected to said diametrical member, and a wall connecting said axial portion of said unit to said casing, said wall being tiltable out of a plane transverse to the axis of said casing, said diametrical member having a portion engaging a portion of said wall to form a tilting fulcrum therefor solely at one side of said axis, a manually operable valve mechanism to direct fluid pressure from a source to said expansible chamber and from said chamber, and means having mechanical engagement with said diametrical member, with said manually operable valve mechanism and with said wall at the side of said axis opposite said fulcrum, to be moved incident to operation of said valve mechanism and by tilting movement of said movable wall unit by increases in pressure in said expansible chamber to oppose operation of said valve mechanism to thereby tend to reduce the power of the motor mechanism.

5. In a fluid pressure motor mechanism, a motor casing, a pressure responsive unit forming with said casing an expansible chamber, said unit comprising a rigid axial portion, a member extending diametrically across the axis of said rigid portion, a force-transmitting member connected to said diametrical member, and a wall connecting said axial portion of said unit to said casing, said wall being tiltable out of a plane transverse to the axis of said casing, said diametrical member having a portion engaging a portion of said wall to form a tilting fulcrum therefor, a manually operable valve mechanism to direct fluid pressure from a source to said expansible chamber and from said chamber, and a lever arranged diametrically of the axis of said unit and having an end portion engageable with said valve mechanism axially of said unit, the other end portion of said lever engaging said wall to the side of said axis opposite said fulcrum, said diametrical member having a fulcrum portion engaging said lever intermediate its ends whereby said lever will rock incident to forces applied thereto by said valve mechanism and by a tilting movement of said wall incident to increases in pressure in said expansible chamber to oppose operation of said valve mechanism to thereby tend to reduce the power of the motor mechanism.

6. A motor mechanism according to claim 5 wherein said fulcrum portion of said diametrical member engaging said lever is a straight edge, and pivot means connecting said lever on said axial portion of said unit for rocking movement on an axis lying substantially in the plane of said fulcrum edge, such plane being parallel to the axis of said unit.

7. In a fluid pressure motor mechanism, a motor casing, a pressure responsive unit forming with said casing an expansible chamber, said unit comprising a rigid axial body, a diametrical plate fixed to said body at one side thereof, a force-transmitting member fixed at one end to said diametrical plate, said body being of smaller diameter than said casing to provide an annular space between said body and said casing, and a movable wall comprising a flexible diaphragm sealed to said body and said casing and further including an annular plate in said space, said diametrical plate having at one side of the axis of said body a fulcrum edge engaging said annular plate whereby the latter is tiltable by movement of said plate at the opposite side of said axis, a manually operable valve mechanism to direct fluid pressure from a source to said expansible chamber and from said chamber, said mechanism projecting through said body from the side thereof opposite said diametrical plate and including a manually operable member axially of said body spaced from said diametrical plate, and a lever fulcrumed intermediate its ends on said diametrical plate and having opposite ends engaging said manually operable member and said annular plate at said opposite side of said axis to be rocked on its fulcrum in response to forces applied against the ends of said lever respectively by said manually operable member and by said plate incident to pressure increases in said expansible chamber to oppose operation of said valve mechanism.

8. A motor mechanism according to claim 7 wherein said end of said lever engageable with said manually operable member lies between said manually operable member and said diametrical plate normally in engagement with the latter, said manually operable member being engageable with said end of said lever to transmit force therethrough to said diametrical plate upon a failure of said source of power.

9. A motor mechanism according to claim 7 wherein said lever and said body have cooperatively engageable portions supporting said lever for turning movement on an axis lying in a plane coincident with the fulcrum connection of said lever with said diametrical plate, such plane being parallel to the axis of said body.

10. A motor mechanism according to claim 7 wherein said annular plate is provided with a cylindrical portion surrounding a portion of said body and terminating in an inwardly extending flange engageable with said fulcrum edge, said portion of said body having supporting lugs engaging said cylindrical flange, two of such lugs lying in a common plane with said fulcrum edge, such plane being parallel to the axis of said body.

11. A motor mechanism according to claim 7 wherein said annular plate is provided with a cylindrical portion surrounding a portion of said body and terminating in an inwardly extending flange engageable with said fulcrum edge, said portion of said body having supporting lugs engaging said cylindrical flange, two of such lugs lying in a common plane with said fulcrum edge, such plane being parallel to the axis of said body, said fulcrum edge being at one end of said diametrical plate, the other end of such plate having a fulcrum edge against which said lever is fulcrumed, and means providing a pivot axis between said lever and said body, such axis lying in a common plane with said second fulcrum edge, said plane being parallel to the axis of said body.

References Cited by the Examiner

UNITED STATES PATENTS

| | | | |
|---|---|---|---|
| 2,832,316 | 4/1958 | Ingres | 91—269 |
| 2,989,033 | 6/1961 | Stelzer | 91—369 |
| 2,990,917 | 7/1961 | Stelzer | 91—269 |
| 3,102,453 | 9/1963 | Brooks et al. | 91—369 |

SAMUEL LEVINE, *Primary Examiner.*

FRED E. ENGELTHALER, *Examiner.*